United States Patent Office 3,155,713
Patented Nov. 3, 1964

3,155,713
PROCESS OF PRODUCING 4-HYDROXY-2-BUTY-NYL N-(3-HALOPHENYL)CARBAMATES
Thomas R. Hopkins, Johnson County, and Paul D. Strickler, Fairway, Kans., assignors, by mesne assignments, to Gulf Oil Corporation, Pittsburgh, Pa., a corporation of Pennsylvania
No Drawing. Filed Sept. 5, 1961, Ser. No. 135,763
6 Claims. (Cl. 260—471)

This invention relates to chemical compounds and processes of producing the same. More particularly, this invention is concerned with the production of valuable halobutynyl carbamates possessing selective herbicidal properties and processes and intermediates useful in producing such compounds.

This application is a continuation-in-part of our copending application Serial No. 770,266, filed October 29, 1958, now abandoned.

It is disclosed in copending United States Patent No. 2,906,614 that 4-halo-2-butynyl N-(3-halophenyl)carbamates are valuable selective herbicides especially useful for retarding the growth of wild oats in the presence of other growing grains.

United States Patent No. 2,906,614 discloses that the 4-halo-2-butynyl N-(3-halophenyl)carbamates may be produced by reacting a 3-halophenyl isocyanate with a 4-halo-2-butyne-1-ol or by the reaction of a 4-halo-2-butynyl haloformate with a 3-haloaniline. Both of these processes, however, require the use of a 4-halo-2-butynol-1 as an intermediate. The 4-halo-2-butynol-1 compounds are very irritating chemicals, being vessicants and lachrymators, as well as being chemically unstable, so that the use of these compounds is undesirable. Furthermore, the 4-halo-2-butynol-1 compounds are prepared by halogenating 2-butyne-1, 4-diol; this reaction gives low yields of the desired product.

It has now been discovered that the 4-halo-2-butynyl N-(3-halophenyl)carbamates may be readily produced in high yields by reacting 2-butyne-1,4-diol with a 3-halophenyl isocyanate to produce a novel 4-hydroxy-2-butynyl N-(3-halophenyl)carbamate, as an intermediate, which is then halogenated to form the 4-halo-2-butynyl N-(3-halophenyl) carbamate. This process may be represented as follows:

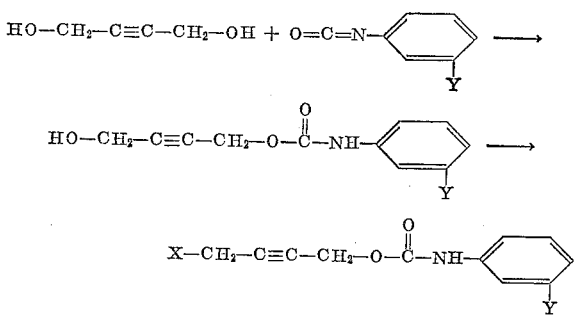

wherein X and Y are the same or different halogens, and particularly chlorine or bromine.

Representative of 3-halophenyl isocyanates which may be employed in the first step of the reaction are 3-chlorophenyl isocyanate and 3-bromophenyl isocyanate.

The reaction between 2-butyne-1,4-diol and a 3-halophenyl isocyanate is conveniently effected by bringing the reactants together in a suitable liquid reaction medium. Inert organic liquids such as acetone, benzene, ether, carbon tetrachloride and chloroform are representative solvents which may be used for this purpose. Substantially anhydrous reaction conditions are desirable to obtain highest yields. The presence in the reaction mixture of a basic substance such as pyridine is advisable to catalyze the reaction. Room temperature and somewhat higher or lower temperatures therefrom are suitable for effecting the reaction. At such temperatures the reaction gives high yields of the desired product in a short time. An hour or less ordinarily is sufficient reaction time, particularly at slightly increased temperatures.

In order to minimize the formation of the undesirable 1,4-bis-(3-halophenylcarbamyl)butyne-2 which can result from the reaction of two moles of the 3-halophenyl isocyanate with one mole of 2-butyne-1,4-diol, it is desirable to use an excess of 2butyne-1,4-diol, and advisably four or more moles of the diol to each mole of the isocyanate. Even though an excess of the diol is used, the high reactivity of the hydroxy groups of the butyne diol results in formation of some bis-carbamate as a by-product. It has further been found in accordance with the invention that the reaction mixture containing mono-carbamate, bis-carbamate and unreacted diol can be extracted with a solvent selected from the group consisting of diisopropyl ether, ethylene dichloride, and chloroform to yield a solution of the mono-carbamate which can then be halogenated to give a biologically active composition comprising a 4-halo-2-butynyl N-(3-halophenyl) carbamate. Methylene dichloride and toluene can also be used as selective solvents for this purpose. In addition, the mono-carbamate may be separated readily from the bis-carbamate by their differences in solubilities in water. It has also been found that water is an effective solvent for separating the mono-carbamate from the bis-carbamate since the bis-carbamate is not appreciably soluble in hot water while the mono-carbamate is soluble therein.

Representative of the novel 4-hydroxy-2-butynyl N-(3-halophenyl)carbamates which are so produced are 4-hydroxy-2-butynyl N-(3-chlorophenyl)carbamate and 4-hydroxy-2-butynyl N-(3-bromophenyl)carbamate.

The 4-hydroxy-2-butynyl N-(3-halophenyl)carbamates are readily converted to the 4-halo-2-butnyl N-(3-holophenyl)carbamates by reaction with a suitable halogenating agent. Among the halogenating agents which may be employed are thionyl halides such as thionyl chloride, phosphorus trihalides such as phosphorus tribromide, and phosphorus pentahalides such as phosphorus pentachloride.

The halogenation is advisably effected under liquid reaction conditions. This may be achieved by use of an excess of halogenating agents which are liquids at the reaction temperatures or, and preferably, by the use of inert organic solvents such as xylene, benzene, toluene, chloroform and carbon tetrachloride. It is desirable to have present during the reaction an organic base such as pyridine to combine with the hydrogen halide as it is formed in the reaction.

Reaction temperatures will vary considerably with the solvents used. However, room temperature is usually satisfactory to effect the reaction with most of the halogenating agents. Substantially complete halogenation is achieved in about 1 to 3 hours although the time will obviously vary with the halogenating agent and other conditions used. The desired product may be separated from the reaction mixture by conventional methods.

Some of the halobutynyl carbamates which may be produced from the 4-hydroxy-2-butynyl N-(3-halophenyl)-carbamates are 4-bromo-2-butynyl N-(3-bromophenyl)-carbamate, 4-bromo-2-butynyl N-(3-chlorophenyl)-carbamate, 4-chloro-2-butynyl N-(3-bromophenyl)carbamate, and 4-chloro-2-butynyl N-(3-chlorophenyl)carbamate.

The following examples are presented to illustrate specific embodiments of the invention. It should be understood, however, that the invention is not thereby to be restricted to these examples.

EXAMPLE 1

4-Hydroxy-2-Butynyl N-(3-Chlorophenyl)Carbamate

A solution of 15.3 g. (0.1 mole) of 3-chlorophenyl isocyanate in 50 ml. of acetone was added dropwise with stirring to an acetone solution (300 ml.) of 43.0 g. (0.5 mole) of 2-butyne-1,4-diol at ambient temperature. The resulting solution was stirred and refluxed for 1 hour. The solution was cooled and then diluted with 750 ml. of water, boiled to expel the bulk of the acetone, filtered hot and the filtrate chilled. The crystalline precipitate was removed by filtration to give 15.0 g. of cream-colored crystalline 4-hydroxy-2-butynyl N-(3-chlorophenyl)carbamate, M.P. 78–82° C. This represents a 65% yield based on 3-chlorophenyl isocyanate. The water-insoluble material (5.1 g.) which had been filtered from the hot aqueous solution melted at 120–125° C. and was assumed to be the crude bis-carbamate. Evaporation of the filtrate to dryness gave 34.4 g. (96% recovery) of the unreacted butyne diol.

After recrystallization from water the purified hydroxybutynyl carbamate melts at 86.5–87° C.

EXAMPLE 2

4-Hydroxy-2-Butynyl N-(3-Bromophenyl)Carbamate

4-Hydroxy-2-butynyl N-(3-bromophenyl)carbamate was prepared by the procedure of Example 1 in which 1 mole of 2-butyne-1,4-diol was reacted with 0.1 mole of 3-bromophenyl isocyanate. The crystalline product melts at 102.5–103° C.

The extraction of the mono-carbamate by selective solvents from the crude reaction mixture is illustrated by the data set forth in Table I below. In each of the experiments summarized in this table, a weighed quantity (about 50 grams) of a crude reaction mixture containing 34.6% by weight of 4-hydroxy-2-butynyl N-(3-chlorophenyl)carbamate, 5.6% of bis-carbamate, and 59.8% of 2-butyne-1,4-diol was extracted three times with 100 ml. portions of the solvent under test at 50° C., a temperature at which the crude reaction mixture was fluid. The combined solvent layers were washed once with 100 ml. of water to remove any diol which may also have extracted. The extracted residue, water wash and solvent layer were then evaporated to dryness to obtain percent solids. The material in the solvent layer was then analyzed. As shown in the table, in some cases a small quantity (about 10–25% by weight of the total sample) of water was employed with the solvent. This water was found to improve both the selectivity and capacity of the solvent used in the separation.

Use of the selective solvents of the invention produces a liquid fraction rich in mono-carbamate. This fraction is ideally suited for use in the halogenation of the mono-carbamate, which is advisably carried out under liquid reaction conditions, as previously noted.

The following examples show the conversion of the 4-hydroxy-2-butynyl N-(3-halophenyl)carbamates to the selective herbicidal 4-halo-2-butynyl N-(3-halophenyl) carbamates.

EXAMPLE 3

4-Chloro-2-Butynyl N-(3-Chlorophenyl)-Carbamate

A solution of 9.5 g. (0.08 mole) of thionyl chloride in 25 ml. of chloroform was added, with stirring, to a solution of 15.0 g. (0.065 mole) of crude 4-hydroxy-2-butynyl N-(3-chlorophenyl)carbamate and 10 g. of pyridine in 100 ml. of chloroform over a 1.5 hour period at ambient temperature. The solution was stirred for an additional 3 hours, washed with water and aqueous sodium bicarbonate solution and dried over anhydrous calcium sulfate. The dried chloroform solution was concentrated to about half volume, diluted with n-hexane and chilled. The crystalline precipitate was removed by filtration to give 14.0 g. (83.6%) of crude 4-chloro-2-butynyl N-(3-chlorophenyl)carbamate, M.P. 70–73° C. Treatment of the crude product in a benzene solution with decolorizing carbon and subsequent dilution with n-hexane precipitated 10.0 g. of nearly white, crystalline product, M.P. 73–74° C.

EXAMPLE 4

4-Chloro-2-Butynyl N-(3-Chlorophenyl)Carbamate

To a suspension of 2.1 g. (0.01 mole) of phosphorus pentachloride in 25 ml. of chloroform was added a solution of 2.4 g. (0.01 mole) of 4-hydroxy-2-butynyl N-(3-chlorophenyl)carbamate and 800 mg. (0.01 mole) of pyridine in 25 ml. of chloroform over a period of 30–40 minutes at about 0° C. The solution was then warmed to room temperature and kept at that temperature for about 3 hours. The chloroform solution was washed repeatedly with water, dried over anhydrous sodium sulfate and the solvent removed by distillation under reduced pressure. The residue was dissolved in about 20 ml. of hot benzene. Half of the benzene solution was placed on an alumina column. Elution with about 100 ml. of a benzene-ether (90:10 by volume) mixture and subsequent removal of the solvent from the eluate gave a residue which upon recrystallization gave 658 mg. (51%) of 4-chloro-2-butynyl N-(3-chlorophenyl)carbamates, M.P. 76–77° C.

TABLE I

| Solvent | Weight Reaction Mixture Extracted (grams) | Mono-carbamate | Bis-carbamate | Diol | Weight of Extracted Residue (grams) | Weight Solids in Water Wash (grams) | Weight Solids Extracted (grams) | Percent Mono-carbamate in Solid Extract | Percent of Total Mono-carbamate Extracted | Percent of Total Diol Extracted |
|---|---|---|---|---|---|---|---|---|---|---|
| Diisopropyl Ether | 50.0 | 17.3 | 2.8 | 30.0 | 29.8 | 6.5 | 11.1 | 78 | 49.0 | 21.6 |
| Do | [1] 49.1 | 15.3 | 2.5 | 26.4 | 22.6 | 6.1 | 14.0 | 85 | 77.7 | 23.1 |
| Do | [2] 65.7 | 17.0 | 2.7 | 29.6 | 28.1 | 2.5 | 17.2 | 86 | 87.0 | 17.6 |
| Ethylene Dichloride | 50.0 | 17.3 | 2.8 | 30.0 | 18.6 | 11.0 | 17.5 | 80 | 81.0 | 37.0 |
| Chloroform | 49.0 | 17.0 | 2.7 | 29.3 | 27.2 | 7.3 | 11.2 | 85 | 55.8 | 24.9 |

[1] 10% H$_2$O.  [2] 25% H$_2$O.

It will be seen from Table I that the selective solvents of the invention were effective in separating at least about 50% of the mono-carbamate as a fraction of relatively high purity. By contrast, a number of other solvents were ineffective for this separation, either because they were miscible with the sample at the extraction temperature or because they were able to extract only minor proportions of the mono-carbamate. These ineffective solvents include methylethyl ketone, methyl isobutyl ketone, ethyl carbonate, isoamyl acetate, diethylene glycol diethyl ether, methyl cellosolve, nitromethane, triethylamine, triethylphosphate, benzene, carbon tetrachloride, 1,1,1-trichloroethane, and cyclohexane.

Various changes and modifications of the invention can be made and, to the extent that such variations incorporate the spirit of this invention, they are intended to be included within the scope of the appended claims.

What is claimed is:

1. The process of producing a 4-hydroxy-2-butynyl N-(3-halophenyl) carbamate which comprises reacting a 3-halophenyl isocyanate with an excess of 2-butyne-1,4-diol, and selectively extracting the reaction mixture with a solvent selected from the group consisting of diisopropyl ether, ethylene dichloride and chloroform to isolate said carbamate.

2. The process of producing a 4-hydroxy-2-butynyl N-(3-halophenyl) carbamate which comprises reacting one mole of 3-chloro-phenyl carbamate with at least four moles of 2-butyne-1,4-diol, and selectively extracting the reaction mixture with a solvent selected from the group consisting of diisopropyl ether, ethylene dichloride and chloroform to isolate said carbamate.

3. The process of claim 2 wherein said solvent is diisopropyl ether.

4. The process of claim 2 wherein said solvent is ethylene dichloride.

5. The process of claim 2 wherein said solvent is chloroform.

6. The process of claim 2 wherein there is also present in said reaction mixture water in an amount of about 10–25% by weight.

References Cited in the file of this patent

UNITED STATES PATENTS

| | | |
|---|---|---|
| 2,433,440 | Curd et al. | Dec. 30, 1947 |
| 2,555,989 | Newman | June 5, 1951 |
| 2,788,268 | Tursich | Apr. 9, 1957 |
| 2,819,294 | Pechukas | Jan. 7, 1958 |
| 2,906,614 | Hopkins et al. | Sept. 29, 1959 |

OTHER REFERENCES

Bailey et al.: J. Am. Chem. Soc., vol. 77, pages 165–6 (1955).

Vogel: Op. Cit., pages 124–125.

Vogel: A Textbook of Practical Organic Chemistry (London, 1957), pages 149–51.